(12) United States Patent
Castellano Aldave et al.

(10) Patent No.: US 11,053,000 B2
(45) Date of Patent: Jul. 6, 2021

(54) AERODYNE WITH VERTICAL-TAKEOFF-AND-LANDING ABILITY

(71) Applicants: FUVEX SISTEMAS, S.L., Navarra (ES); UNIVERSIDAD PÚBLICA DE NAVARRA, Navarra (ES)

(72) Inventors: Jesús Carlos Castellano Aldave, Navarra (ES); Jesus Villadangos Alonso, Navarra (ES); José Javier Astrain Escola, Navarra (ES); Carlos Matilla Codesal, Madrid (ES); Mael Taleb, Navarra (ES); Tania Jorajuría Gomez, Navarra (ES); Ermö Peter Cosma, Madrid (ES)

(*) Notice: Subject to any disclaimer, the term of this patent is extended or adjusted under 35 U.S.C. 154(b) by 435 days.

(21) Appl. No.: 15/773,785

(22) PCT Filed: Oct. 14, 2016

(86) PCT No.: PCT/ES2016/000112
§ 371 (c)(1),
(2) Date: Aug. 21, 2018

(87) PCT Pub. No.: WO2017/077144
PCT Pub. Date: May 11, 2017

(65) Prior Publication Data
US 2019/0152593 A1    May 23, 2019

(30) Foreign Application Priority Data
Nov. 4, 2015 (ES) .................. P201531579

(51) Int. Cl.
*B64C 27/28* (2006.01)
*B64C 29/00* (2006.01)
(Continued)

(52) U.S. Cl.
CPC .............. *B64C 27/28* (2013.01); *B64C 27/26* (2013.01); *B64C 27/37* (2013.01); *B64C 29/0016* (2013.01); *B64C 29/0033* (2013.01)

(58) Field of Classification Search
CPC ..... B64C 27/28; B64C 29/0016; B64C 27/26; B64C 27/37; B64C 29/0033; B64C 11/46; B64D 27/26
See application file for complete search history.

(56) References Cited

U.S. PATENT DOCUMENTS

| 3,231,221 A | 1/1966 | Platt |
| 3,934,843 A | 1/1976 | Black |

(Continued)

FOREIGN PATENT DOCUMENTS

EP    2625098    8/2013

OTHER PUBLICATIONS

"FLUTTER" Understanding Airplanes YouTube—27 set 2015 from Internet URL:https://www.youtube.com/watch?v=egDWh7jnNic.
(Continued)

*Primary Examiner* — Medhat Badawi
*Assistant Examiner* — Vicente Rodriguez
(74) *Attorney, Agent, or Firm* — Eugenio J. Torres-Oyola; Victor M. Rodriguez-Reyes; Rafael Rodriguez-Muriel (57) ABSTRACT

The invention relates to an aerodyne with vertical take-off and landing ability and the ability to generate lift by means of both rotors and fixed wings, which includes: a fuselage (1); two fixed wings (2); two front rotors (11) and two rear rotors (12) arranged symmetrically and actuated by means of motors (13), each rotor (10) being attached to a central portion of a fixed wing (2) by means of a support (14) and connected pivotably about a connection shaft (E2), which allows changing the inclination of each rotor (10) from a longitudinal forward movement position, in which they (Continued)

propel the aerodyne horizontally, to a lift position in which it provides vertical lift; said rear rotors being in a lift position partially overlapping a portion of the wing including a flap (20) freely connected to the rest of the wing, the position thereof being determined between a lift position and a longitudinal forward movement position by the effect of the aerodynamic thrust.

18 Claims, 6 Drawing Sheets

(51) Int. Cl.
*B64C 27/26* (2006.01)
*B64C 27/37* (2006.01)

(56) References Cited

U.S. PATENT DOCUMENTS

| | | | |
|---|---|---|---|
| 5,096,140 A | 3/1992 | Dornier, Jr. et al. | |
| 6,655,631 B2 | 12/2003 | Austen-Brown | |
| 8,342,441 B2 * | 1/2013 | Yoeli | B64C 29/0033 244/12.4 |
| 9,254,916 B2 * | 2/2016 | Yang | B64C 3/546 |
| 2003/0009453 A1 | 5/2003 | Austen-Brown | |
| 2003/0094537 A1 * | 5/2003 | Austen-Brown | B64D 25/00 244/7 R |
| 2012/0261523 A1 * | 10/2012 | Shaw | B64C 27/28 244/7 R |
| 2015/0013689 A1 | 1/2015 | Shackelford | |
| 2015/0136897 A1 * | 5/2015 | Seibel | B64D 27/24 244/6 |
| 2015/0175260 A1 * | 6/2015 | Hesselbarth | B65D 90/08 244/7 A |

OTHER PUBLICATIONS

International search report dated Jan. 3, 2017 for PCT/ES2016/000112.

* cited by examiner

AERODYNE WITH VERTICAL-TAKEOFF-AND-LANDING ABILITY

RELATED APPLICATIONS

This application is a US national phase application of international application number PCT/ES2016/000112, filed 14 Oct. 2016, which designates the US and claims priority to Spanish application P201531579 filed 4 Nov. 2015, the contents of each of which are hereby incorporated by reference as if set forth in their entireties.

FIELD OF THE ART

The present invention relates to the field of aerodynes with vertical take-off and landing ability and the ability to generate lift by means of both rotors and fixed wings, which allows vertical take-off and swift horizontal movement.

STATE OF THE ART

Heavier-than-air aircrafts referred to as aerodynes are known; some of which aerodynes have the ability to perform vertical take-off and landing by means of the lift obtained from the rotation of rotors producing vertical thrust, and at the same time they also have the ability to tilt said rotors for them to produce a horizontal thrust which propels the aerodyne horizontally through the air, creating an air stream around fixed wings of the aerodyne which produce lift that is sufficient to keep said aerodyne airborne.

An example of said prior art documents is document U.S. Pat. No. 3,231,221, which places pairs of rotors at the ends of fixed wings in a tiltable manner. This prior art document places said rotors in positions very far from the fuselage, which constitutes a drawback for the length and weight of the fixed wings which have to withstand significant strains due to said end position of the rotors.

Document US2015136897 also describes an aerodyne of this type; in this case, however, the aerodyne consists of four rotors in the lift position, but the way in which they are connected to the wings causes two of the rotors to slow down the forward movement of the aerodyne during transition from the vertical lift position to the longitudinal forward movement position, so their blades must be stopped and retracted, with only two operating rotors remaining to propel the aircraft.

On the other hand, the aircraft described in document EP2625098 has four rotors, two of which are front rotors placed in front of the leading edge of the wing, and the other two are rear rotors placed behind the trailing edge of the wing, so said four rotors are spaced substantially spaced apart from one another. Their distance prevents both of them from being able to tilt about a common center, because in that case they would be separated a great distance from the wing in the longitudinal forward movement position, producing a large momentum during lift, and losing part of the aerodynamic effect that may be produced on the fixed wings.

Finally, document U.S. Pat. No. 6,655,631 describes an aircraft equipped with four rotors, two of which are front rotors and the other two rear rotors, wherein said rotors can tilt between a longitudinal forward movement position and a lift position in which they produce a vertical airflow. In this example, the rear rotors partially overlap a portion of the fixed wing housing the actuated ailerons for aircraft control when they are in the lift position, and said ailerons can be actuated for positioning them in a position perpendicular to the position of the rest of the wing, so they no longer constitute an interference for the vertical airflow generated by the rear rotors located in the lift position. However, said actuated ailerons require actuated control elements which increase their weight and require more maintenance. Furthermore, the present document does not propose moving the rotors close enough to one another so as to be able to tilt the front and rear rotors about a common center such that they are not arranged very far from the surfaces of the wing, which would reduce aerodynamic efficacy.

BRIEF DESCRIPTION OF THE INVENTION

The present invention relates to an aerodyne with vertical take-off and landing ability and the ability to generate lift by means of both rotors and fixed wings.

An aerodyne is any heavier-than-air aircraft the lift of which is achieved by the effect of aerodynamics. In the case of the proposed aerodyne, lift can be achieved by means of two different systems, on one hand by means of rotors equipped with rotary blades such as those used in helicopters, and on the other hand by means of fixed wings such as those used in airplanes.

The proposed aerodyne therefore includes:
- a fuselage defining a longitudinal axis, a transverse axis, and a vertical axis, said three axes being orthogonal to one another;
- at least two fixed wings arranged symmetrically on two opposite sides of the fuselage, providing two lifting surfaces that are sufficient to keep the aerodyne airborne as it moves forward through the air in the direction of the longitudinal axis;
- at least two front rotors and two rear rotors arranged symmetrically on two opposite sides of the fuselage and actuated by means of independent motors;
  - each rotor defining an axis of rotation;
  - each rotor being attached to a central portion of a fixed wing by means of a support;
  - each rotor being connected to said fixed wing to which the rotors are attached in a manner that is pivotable about a connection shaft parallel to the transverse axis of the fuselage, which allows changing the inclination of the axes of rotation of each rotor with respect to the fixed wing from a longitudinal forward movement position parallel to the longitudinal axis of the fuselage, in which the rotors propel the aerodyne through the air in the longitudinal direction, to a lift position parallel to the vertical axis of the fuselage, in which the rotation actuated by the motor of the rotors provides lift that is sufficient to keep the aerodyne airborne; the front rotors being arranged in front of the leading edge of the fixed wings in the lift position, and below the fixed wings in the longitudinal forward movement position; and the rear rotors being arranged behind the leading edge of the fixed wings in the lift position, and above the fixed wings in the longitudinal forward movement position;

Said fuselage will preferably be elongated in the direction of the longitudinal axis and adopt an aerodynamic shape to reduce the friction brought about as it moves forward through the air in the longitudinal direction. The transverse axis will be perpendicular to said longitudinal axis, and finally the vertical axis will be perpendicular to the longitudinal and transverse axes. It will be understood that the vertical axis does not have to be vertical with respect to the ground, since the position of the aerodyne with respect to the ground will vary during flight.

There are symmetrically arranged on two opposite sides of the fuselage four rotors, one front rotor and one rear rotor on each side, and two fixed wings, each equipped with an airfoil providing a lifting surface.

Said fixed wings will have a size and shape that offers lift that is sufficient to keep said aerodyne airborne as it moves forward in the direction of the longitudinal axis propelled by the at least four rotors arranged in the longitudinal forward movement position.

Each rotor is fixed to a central portion of a wing by means of a support, where said central portion can be defined, by way of non-limiting example, as a portion of the wing corresponding to 85% of its length and centered with respect to its ends. Said rotors are preferably fixed at the end closest to the fuselage of said central portion, leaving the rotors spaced apart from the fuselage by a minimum safety distance.

The rotors will be connected to the wing in which the rotors are fixed in a manner that is pivotable about a connection shaft parallel to the transverse axis of the fuselage, allowing the axis of rotation of each rotor to pivot in a plane perpendicular to said transverse axis from a longitudinal forward movement position to a lift position.

In the longitudinal forward movement position, the axis of rotation of the rotors is parallel to the longitudinal axis of the fuselage, and therefore the rotation of said rotors about the corresponding axis of rotation thrusts the aerodyne in the direction of the longitudinal axis, causing it to move forward through the air, and causing an airflow to circulate around the airfoil of the fixed wings, lifting the aerodyne due to aerodynamic effect of said fixed wings.

In the lift position, the axis of rotation of the rotors is parallel to the vertical axis of the fuselage, and therefore the rotation of said rotors about the corresponding axis of rotation thrusts the aerodyne in the direction of the vertical axis of the fuselage enough so as to lift the aerodyne into the air. In said lift position, in addition to remaining immobile in the air, the aerodyne can move up, down, frontwards, backwards, to the right, and to the left, and rotate about the vertical axis of the fuselage, all this by means of regulation of the different rotors.

In a novel manner, in the lift position, the present invention proposes for said rear rotors to partially overlap or coincide with a portion of the fixed wing to which they are attached; and in that each wing includes at least one flap in its portion overlapping or coinciding with the rotor, said flap being freely connected to the rest of the wing, the position thereof being determined between a lift position parallel to the vertical axis and a longitudinal forward movement position parallel to the longitudinal axis by the effect of the thrust of the air on said flap; the flap being arranged, in the lift position, outside the airflow propelled by the rotors as it is oriented parallel to said flow; the flap being arranged, in the longitudinal forward movement position, integrated on the lifting surface of the wing as it moves forward through the air in the direction of the longitudinal axis, said flap providing lifting force.

The mentioned flap is therefore connected to the rest of the wing, where its angle can be changed freely by the effect of the air stream striking said flap.

In the lift position, this flap allows placing the rear rotors partially overlapping the fixed wing without the fixed wing interfering with the airflow propelled by said rear rotors, and therefore without losing lifting force, which allows moving the rear rotors so that they are positioned closer to the front rotors up to a distance smaller than the width of the fixed wing.

This smaller distance between the front and rear rotors allow the aerodyne to have a compact body both in the lift position and in the longitudinal forward movement position.

Furthermore, the free connection of the flap allows a strong and simple construction, without mechanical complications or flap actuating mechanisms which would make the aerodyne heavier and more expensive to maintain.

According to an optional embodiment, the flap will be connected to the fixed wing in a position adjacent to the end of the flap closest to the leading edge of the wing in which said flap is housed, so when the rotors are in the lift position, the downward airflow caused by the rear rotors will orient said flaps in a direction almost parallel to the vertical axis of the fuselage, forming an angle with respect to the rest of the fixed wing. On the contrary, the forward movement of the aerodyne through the air in the direction of the longitudinal axis, propelled by the rotors in the longitudinal forward movement position, will produce an airflow that will thrust the part of the flap farthest from said connection, causing it to move up until it is flush with the rest of the fixed wing and aerodynamically integrated therewith.

Said flap will preferably have an upward movement limiter which will prevent the flap from protruding from the upper surface of the wing (its upper face) under any circumstance; therefore in spite the suction thereby produced on the upper face of the flap as the wing moves forward through the air in the direction of the longitudinal axis, said flap will be retained by the upward movement limiter, and said suction will provide lift to the aerodyne assembly, the flap being the functional part of the wing.

Additionally, it is also proposed for each front rotor to be attached to said central portion of the wing by means of a shared support with a rear rotor. Optionally, said shared support can be connected to the fixed wing by means of a single shared connection shaft, whereby both front and rear rotors tilt about one and the same center, and transition from the lift position to the longitudinal forward movement position in a simultaneous and coordinated manner.

Optionally, it is also proposed for said single shared connection shaft to be arranged equidistant from the front rotor and from the rear rotor held by said shared support. This feature allows both rotors to be arranged equidistant from the connection shaft in the longitudinal forward movement position, the rear rotor being arranged above the fixed wing, and the front rotor below the fixed wing.

Additionally, it is proposed for each of said wings to furthermore have at least one actuated aileron acting as airplane control surfaces which allow operating the airplane and can collaborate with other actuated ailerons for controlling the aerodyne.

It is also proposed for the motors which actuate the four rotors to be independently controlled, which allows regulating their speed and/or power, successfully changing the thrust each of the rotors provides, and thereby achieving aerodyne control by means of said regulation.

According to another embodiment, the minimum separation between the blades of the front rotors and the blades of the rear rotors will be smaller than the width of the fixed wing in the central portion thereof, or preferably smaller than half the width of the fixed wing in the central portion thereof, or smaller than the mean width of the fixed wing in the central portion thereof.

According to one embodiment, in the lift position, the support of the front rotor partially overlaps the lower surface of the wing, and in the lift position, the support of the rear rotor partially overlaps the upper surface of the wing. In such case, the connection shaft can be integrated within the thickness of the wing, and the supports of the front rotor and rear rotor connected to said connection shaft through an interposed connecting element. By way of example, such interposed connecting element can be a disk which protrudes from the wing both from its upper surface, where it is connected with the support of the rear rotor, and from its lower surface, where it is connected with the support of the front rotor, and said disk being connected with the connection shaft through the center thereof, such that the rotation thereof causes the rotation of the rear rotor and the front rotor.

The rotation of the supports of the rotors will be envisaged such that the rear rotor is located above the upper surface of the wing in the longitudinal forward movement position, and the front rotor is located below the lower surface of the wing in the longitudinal forward movement position. This thereby allows the possibility of performing a smooth transition from the lift position to the longitudinal forward movement position, or vice versa, during flight.

The use of the interposed connecting element allows for the supports to be arranged overlapping the wing, and not integrated therein, which in turn allows the wing to have a continuous resistant structure along the entire length thereof without being interrupted by a housing for the inclusion of the supports when the rotors are in the lift position. This allows reducing the weight of the wing structure, and therefore of the aerodyne structure in general.

Additionally, it is proposed for the connection shaft to be located in the half of the wing closest to the leading edge, or more preferably in the center of the half of the wing closest to the leading edge.

It is also preferable for the length of the supports of the front rotors to be the same as the length of the supports of the rear rotors. In such case, with the connection shaft placed in the manner that has been described, the rear rotor will partially overlap the trailing edge of the wing.

Another proposed optional feature is that the two front rotors and the two rear rotors, in the lift position, will be arranged equidistant with respect to an axis parallel to the vertical axis of the fuselage which intersects the center of gravity of the aerodyne. In other words, they are arranged equidistant with respect to the vertical of the center of gravity of the aerodyne.

Additionally, it is proposed for the connection shaft to intersect an axis parallel to the vertical axis of the fuselage which in turn intersects the center of gravity of the aerodyne. In other words, said connection shaft is vertically aligned with the center of gravity of the aerodyne.

These features referring to the center of gravity of the aerodyne allow assuring aerodyne stability in the air, and a stable lift, as well as a homogenous operation of all the rotors.

For the purpose of improving the thrust provided by the rotors and providing greater assurance against possible failures of one of the motors or rotors, the possibility of the aerodyne being equipped with four front rotors and four rear rotors is contemplated. Preferably, two motors will be placed at the end of each support, each connected to a rotor such that the two mentioned rotors are parallel to one another, and the two motors actuating the rotors, and the end of the support holding the rotors, are comprised between said two rotors. This configuration allows each of the motors and rotors to be redundantly duplicated, which provides greater assurance should one of them fail, without having to increase the number of supports, which would increase the weight of the assembly.

In an alternative or complementary manner, it is also contemplated to increase the number of supports connected to the wing, each support holding additional motors and rotors, with features that are the same as those described up until now, providing an aerodyne with more front and rear rotors for greater safety. Said additional supports would be arranged along the wing at a greater distance from the fuselage.

It will be understood that references to geometric positions, such as, for example, parallel, perpendicular, tangent, etc., allow deviations of up to ±5 ° with respect to the theoretical position defined by said nomenclature.

Other features of the invention will be seen in the following detailed description of an embodiment.

BRIEF DESCRIPTION OF THE DRAWINGS

The foregoing and other advantages and features will be more clearly understood based on the following detailed description of an embodiment in reference to the attached drawings which must be interpreted in an illustrative and non-limiting manner, in which.

DETAILED DESCRIPTION OF AN EMBODIMENT

Figure 1:
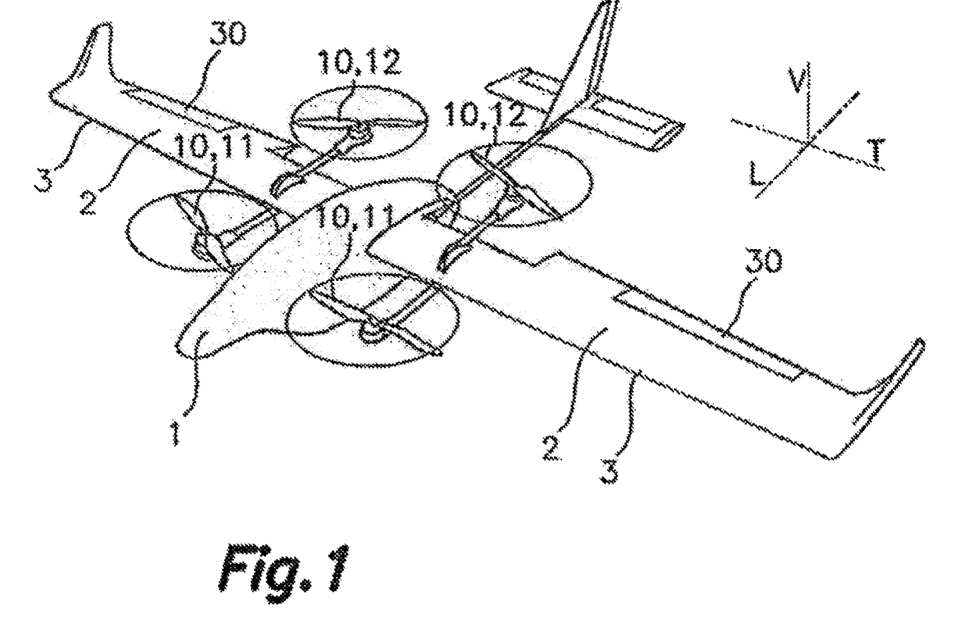
FIG. 1 shows a perspective view of the proposed aerodyne equipped with two front rotors and two rear rotors, all of them arranged in the lift position, according to one embodiment.

FIG. 1 shows in an illustrative non-limiting manner an embodiment of an aerodyne with vertical take-off and landing ability and the ability to generate lift by means of both rotors 10 and fixed wings 2.

The mentioned aerodyne has an elongated central fuselage 1 defining a longitudinal axis L in the major dimension of the fuselage 1, a transverse axis T, and a vertical axis V, all of them being orthogonal to one another.

As seen in FIG. 1, two straight wings 2 with decreasing width at the ends are arranged symmetrically on the sides of the fuselage 1 and parallel to the transverse axis T, said wings having an airfoil which allows generating lift that is sufficient to keep the aerodyne airborne when it moves through the air in the direction of the longitudinal axis L at sufficient speed. Optionally, the aerodyne can have other surfaces projecting from the fuselage to provide aerodyne flight control or stability, such as horizontal or vertical stabilizers, for example, such as in the tail of the aerodyne, for example.

It will be understood that the aerodyne that has been described may have different wing configurations, such as straight wings with a constant chord or other wings, for example. In the illustrated example, the ends of the wings 2 have wing tip devices envisaged for reducing turbulences at said ends, thereby increasing flight efficiency. Said wing tip devices are known in the art as winglets.

The vehicle can also include a landing gear which, since the vehicle has vertical take-off and landing abilities, can be limited to legs or wheels holding the vehicle in a stable position on the ground.

Figure 2:
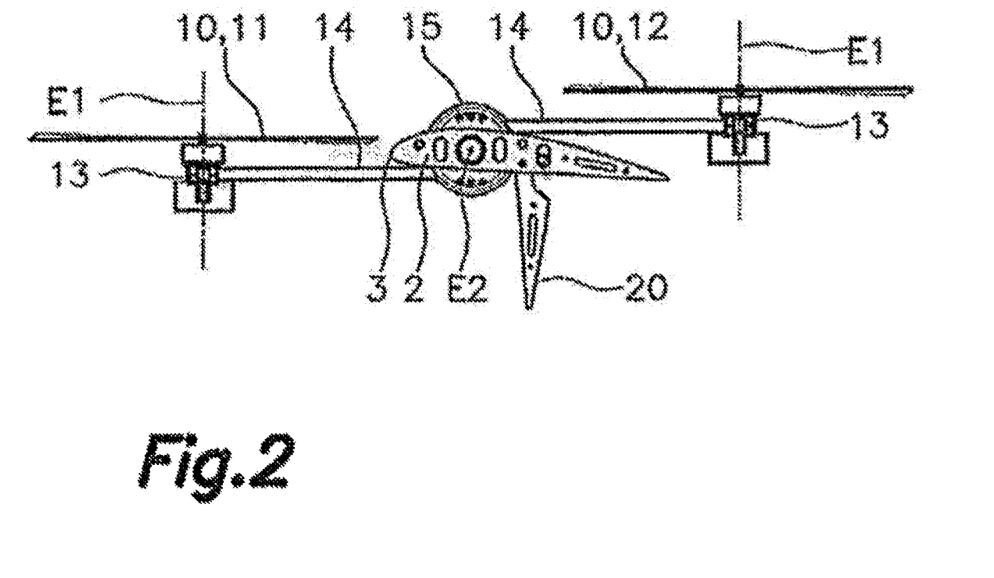
FIG. 2 shows a section view of a wing in which a flap, a front rotor, a rear rotor, their respective motors and supports attached to an interposed connecting element in the form of a plate, can be seen in projection, the mentioned rotors, supports, and flap being arranged in the lift position.

In the present embodiment, each wing 2 has a front rotor 11 and a rear rotor 12, each of them being formed by two blades pivotably attached about an axis of rotation E1, an electric motor 13 powered by a battery (not shown) housed inside the fuselage 1.

In a lift position in which the axis of rotation E1 is parallel to the vertical axis V of the fuselage 1, the front rotor 11 is placed in front of the leading edge 3 of the fixed wing 2, whereas the rear rotor 12 is placed behind said leading edge 3.

Said motor 13 is attached to a support 14, which extends all the way to the wing 2 where the support 14 is fixed to hold the rotor 10, keeping said motor 13 a specific distance away from said wing 2. In the present embodiment, the supports 14 of the front rotor 11 and the rear rotor 12 are of the same length, as seen in the attached drawings.

Figure 3:
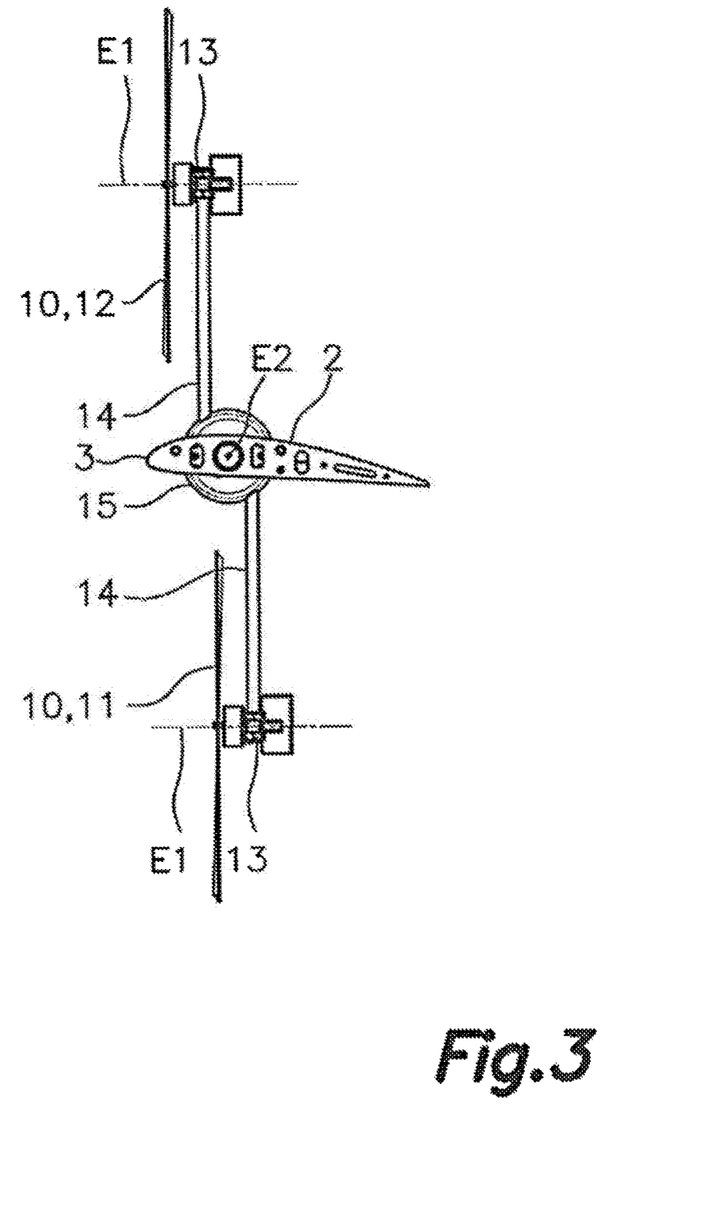
FIG. 3 shows a section view of the same wing shown in FIG. 2, the mentioned rotors, supports, and flap being arranged in the longitudinal forward movement position.
Figure 4:
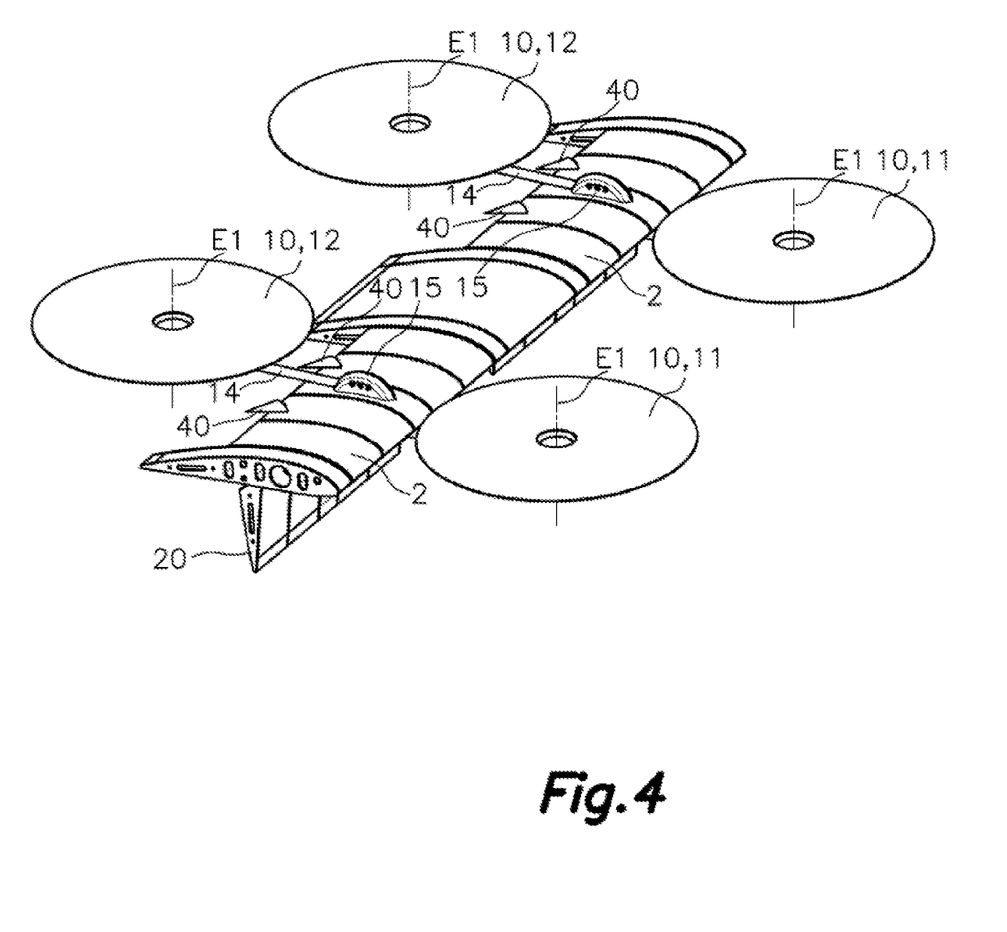
FIG. 4 shows a top perspective view of two wings connected in continuity through the fuselage in which said fuselage and the end portions of the wings are omitted, and two flaps, two front rotors, two rear rotors, attached to the wing by means of the corresponding supports are seen; said rotors being schematically shown as disks where they are, in reality, blades that rotate about the corresponding axes of rotation, said rotors and said flaps being in the lift position.
Figure 5:
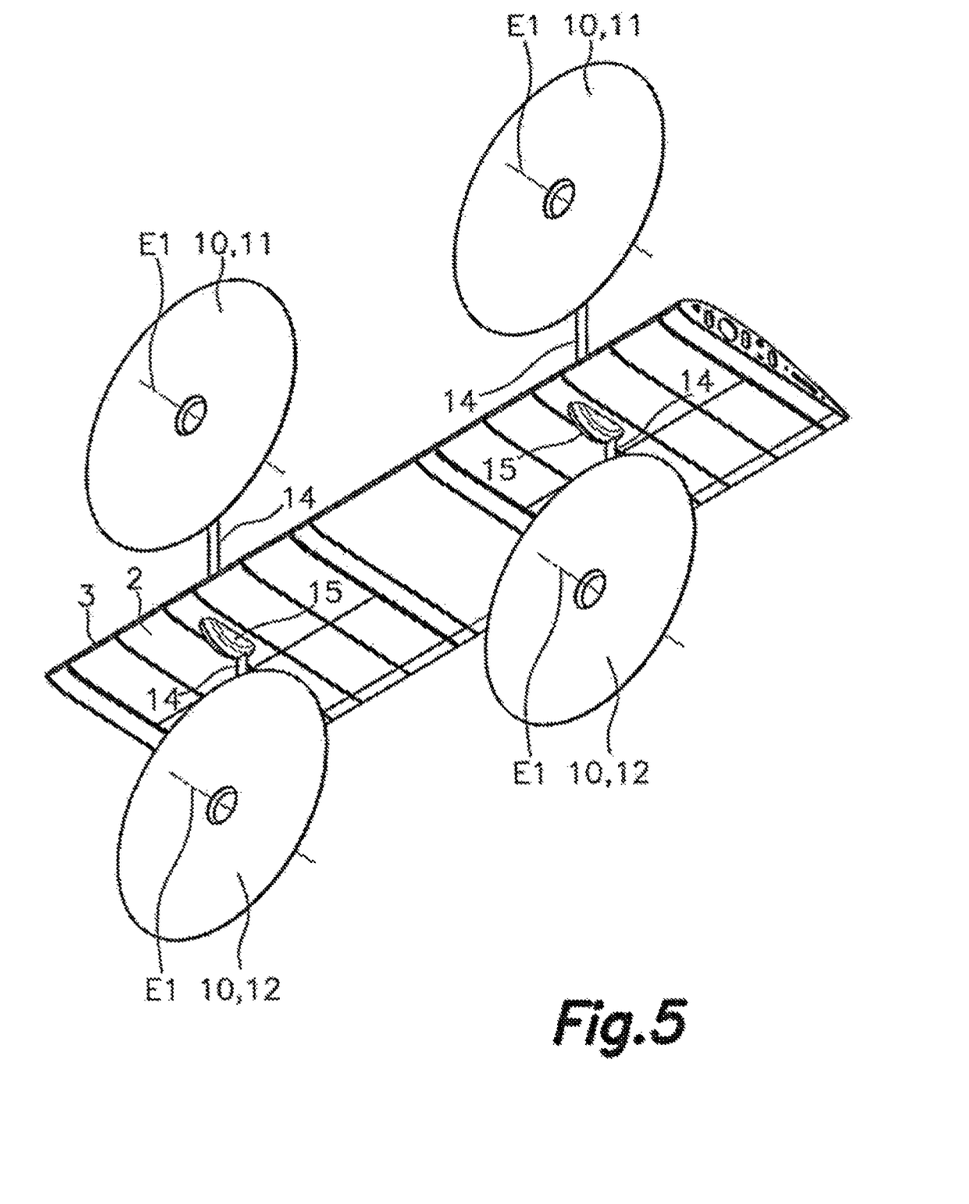
FIG. 5 shows a bottom perspective view of the same wings shown in FIG. 4, the rotors and flaps being arranged in the longitudinal forward movement position.

The support 14 is attached to the wing 2 by means of a connection which allows the support 14 and the motor 13 as well as the rotor 10 attached thereto to pivotably tilt about a connection shaft E2 parallel to the transverse axis T of the fuselage 1. This allows changing the angle of the axis of rotation E1 of the rotor 10 with respect to the fuselage 1 from a lift position, in which said axis of rotation E1 of the rotor 10 is parallel to the vertical axis V of the fuselage 1, to a longitudinal forward movement position, in which the axis of rotation E1 of the rotor 10 is parallel to the longitudinal axis L of the fuselage 1. Said tilt therefore leads to a 90° rotation from the lift position to the longitudinal forward movement position.

In the lift position, the rotors 10 produce a downward airflow and propel the aerodyne vertically, countering its weight and allowing the aerodyne to be kept airborne or to be propelled upwards. The different regulation of the speed and/or power of the electric motors 13 of each rotor 10 also allows producing horizontal movement in any direction at relatively low speeds, rotation of the aerodyne about the vertical axis V, and aerodyne descent.

On the contrary, in the longitudinal forward movement position the rotors 10 propel the aerodyne in the direction of the longitudinal axis L of the fuselage 1 causing it to move swiftly forward through the air, which causes an airflow on the lifting surfaces of the wings 2 providing lift to the aerodyne sufficient to keep it airborne. In this case, the direction of the aerodyne is controlled by means of control surfaces, such as ailerons, rudders, etc. It is also contemplated for the regulation and direction of the aerodyne flying in the longitudinal forward movement position to be done by means of the different regulation of the motors 13 of the rotors 10.

In the present embodiment, the mentioned connection shaft E2 is placed at about a quarter of the width of the wing 2 closer to the leading edge 3 of the wing 2 than to the trailing edge of the wing 2. There is fixed around said connection shaft E2 a disk acting as an interposed connecting element 15 which protrudes from the upper surface of the wing 2 and the lower surface of the wing 2, the mentioned support 14 of the front rotor 11 being integrally attached to the part of the disk protruding from the lower surface of the wing 2, and the mentioned support 14 of the rear rotor 12 being integrally attached to the part of the disk protruding from the upper surface of the wing 2.

This configuration allows 90° tilt of rotors 10 to move the rear rotor 12 up from the lift position until it is placed above the wing 2 in the longitudinal forward movement position, and the front rotor 11 to move down until it is placed below the wing 2 without the wing 2 interfering with the supports 14 during said movement. In the longitudinal forward movement position, the distance between the rotors 10 and the wing 2 will the same as the length of the support 14.

This movement allows transitioning between the lift position and the longitudinal forward movement position in mid-flight.

It is advantageous for the distance between the rotors 10 and the wing 2 to be the smallest possible at all times, and also to be the closest to the fuselage 1, which thereby allows reducing bending strains on the supports 14 and wings 2 which allows reducing their resistance and weight. The aerodynamic effects are also improved with small distances between these elements.

According to the configuration that has been described, the front rotor 11 is located, in the lift position, a small distance from the leading edge 3 of the wing 2 in order to maintain a short length of the support 14. The length of the support 14 of the front rotor 11 being the same as the length of the support 14 of the rear rotor 12 and the connection shaft E2 being located at a quarter of the width of the wing 2 means that, in the lift position, the rear rotor 12 overlaps a little less than the entire rear half the width of the wing 2. This would cause an aerodynamic reduction in the efficacy of the rear rotors 12.

To prevent said aerodynamic reduction, said part of the wing 2 overlapping the rear rotors 12 corresponding to almost the entire rear half of the wing 2 has flaps 20 freely connected to the rest of the wing 2, allowing the free aerodynamic orientation of said flap 20 under the influence of the airflow striking same.

Said flap 20 is connected to the rest of the wing 2 by its edge closest to the leading edge 3 of the wing 2, in other words in a region close to the center of the width of the wing 2, where the flap 20 can tilt between a longitudinal forward movement position, in which it is flush with the rest of the wing 2, completing the airfoil, and a lift position, in which it hangs below the wing 2, perpendicular to same.

When the rotors 10 are in the lift position, the air propelled by the rear rotors 12 and gravity will propel the flap 20 to its lift position perpendicular to the rest of the wing 2. On the contrary, when the rotors 10 are in the longitudinal forward movement position, the airflow produced around the airfoil of the wing 2 as it moves forward through the air will thrust the mentioned flap 20 and keep said flap flush with the rest of the wing 2.

The present embodiment includes an upward movement limiter 40 in the form of a stop which prevents the flap 20 from protruding from the upper surface of the wing 2, not even under the influence of aerodynamic forces thrusting it in said direction. This feature allows the upward force produced on the upper surface of the wing due to the low pressures of the air circulating above said upper surface of the wing 2, suctioning the flap 20 upwards, to be transmitted to the structure of the wing 2 by way of lifting force, the flap 20 becoming part of the lifting surface of the wing 2.

Figure 6:
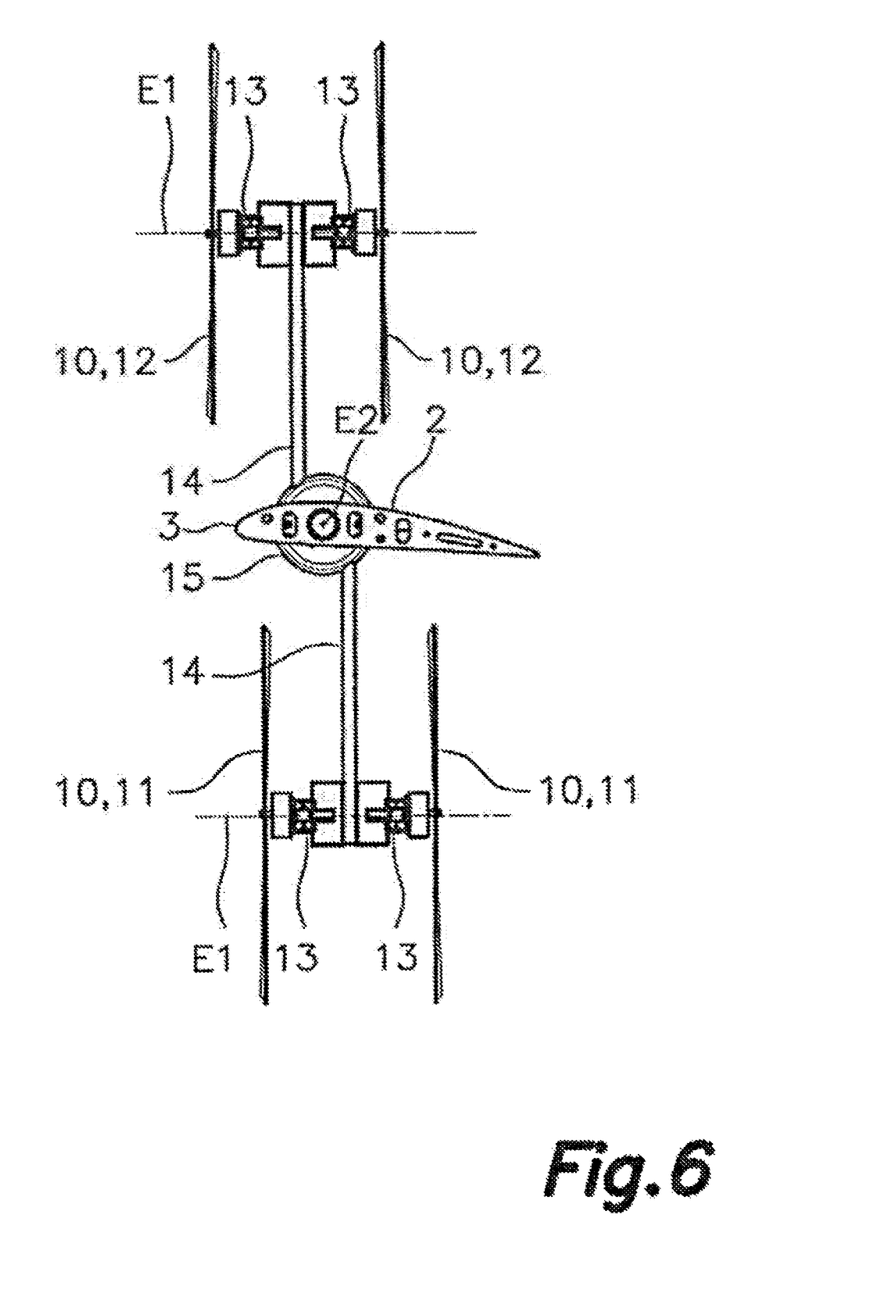
FIG. 6 shows a section view of a wing like the one shown in FIG. 3, but with an alternative embodiment in which there are placed at the end of each support two opposing coaxial motors, each connected to a rotor, said two rotors being held by one and the same support arranged in parallel.

In an alternative embodiment shown in FIG. 6, two rotors 10, each connected to an independent motor 13 are placed at the end of each support 14 in a coaxial, spaced apart, and parallel manner, such that the end of the support 14 holds said two motors 13, which are confined between the two rotors. This configuration allows duplicating the number of motors and rotors of the aerodyne without having to scale up the structure holding them, and said rotors being kept in the optimum position close to the fuselage 1. Duplicating the rotors 10 provides more thrust and also greater assurance against possible failures of a motor 13 or rotor 10.

The invention claimed is:

1. An aerodyne with vertical take-off and landing ability and an ability to generate lift by means of both rotors and fixed wings, said aerodyne including:
   - a fuselage defining a longitudinal axis, a transverse axis, and a vertical axis orthogonal to one another;
   - at least two fixed wings arranged symmetrically on opposite sides of the fuselage, providing two lifting surfaces that are sufficient to keep the aerodyne airborne as it moves forward through the air in direction parallel to the longitudinal axis;
   - at least two front rotors and at least two rear rotors arranged symmetrically on two opposite sides of the fuselage and actuated by means of independent motors;
      - each rotor defines an axis of rotation and is connected to a support pivotally connected to a connection shaft parallel to the transverse axis of the fuselage placed in a central portion of one of the fixed wings;
      - the rotors are actuated to transition during flight, through said pivotal connection, from a lift position with the axes of rotation of the rotors parallel to the vertical axis of the fuselage, providing lift sufficient to keep the aerodyne airborne, to a longitudinal forward movement position with the axes of rotation parallel to the longitudinal axis of the fuselage, propelling the aerodyne through the air in the direction parallel to the longitudinal axis, or to transition from the forward movement position to the lift position;
   the front rotors are arranged in front of a leading edge of the fixed wings in the lift position, and below the fixed wings in the longitudinal forward movement position; and
   the rear rotors are arranged behind the leading edge of the fixed wings in the lift position, and above the fixed wings in the longitudinal forward movement position;
   in the lift position, said rear rotors partially overlap with a portion of the wing to which they are attached;
   each fixed wing includes at least one flap in the portion of the fixed wing overlapped by the rear rotor when in the lifting position, said at least one flap is freely connected to the rest of the wing, and is free aerodynamically orientable under an influence of an airflow striking the at least one flap, produced by the rotors in the lift position, in the longitudinal forward movement position and in intermediate positions, and by gravity, the at least one flap transitioning between a lift position parallel to the vertical axis and a longitudinal forward movement position parallel to the longitudinal axis.

2. The aerodyne according to claim 1, wherein each front rotor has the correspondent support shared with the support of one rear rotor defining a shared support, and the connection shaft of the support of the front and rear rotors is a single shared connection shaft connecting the shared support to the fixed wing, allowing both front and rear rotors to tilt about a single center, and to transit from the lift position to the longitudinal forward movement position in a simultaneous and coordinated manner.

3. The aerodyne according to claim 2, wherein said shared connection shaft is arranged equidistant from the front rotor and from the rear rotor held by the shared support connected to said connection shaft.

4. The aerodyne according to claim 1, wherein each of said fixed wings furthermore has at least one actuated aileron acting as airplane roll control surfaces.

5. The aerodyne according to claim 1, wherein the motors, which actuate the rotors, are independently controlled.

6. The aerodyne according to claim 1, wherein the flap is connected to the fixed wing in a position adjacent to an end of the flap closest to the leading edge of the wing in which said flap is housed.

7. The aerodyne according to claim 1, wherein an attachment of the fixed wing and the at least one flap consists of an upward movement limiter which prevents the at least one flap from protruding from an upper surface of the wing, providing lifting force when the at least one flap is in the longitudinal forward movement position.

8. The aerodyne according to claim 1, wherein a minimum separation between blades of the front rotors and blades of the rear rotors is smaller than a width of the fixed wing in the central portion thereof.

9. The aerodyne according to claim 1, wherein the minimum separation between the blades of the front rotors and the blades of the rear rotors is smaller than half the width of the fixed wing in the central portion thereof.

10. The aerodyne according to claim 1, wherein in the lift position, the support of a front rotor is partially overlapped by a lower surface of the wing; and in the lift position, the support of a rear rotor partially overlaps an upper surface of the wing.

11. The aerodyne according to claim 2, wherein the support, which is shared by one rear and one front rotors, is connected to the connection shaft, which is integrated within a thickness of the wing, through an interposed connecting element integrated in the support and, when in the lift position, a portion of the support connected to the front rotor is partially overlapped by a lower surface of the wing and a portion of the support connected to the rear rotor partially overlaps an upper surface of the wing.

12. The aerodyne according to claim 11, wherein the interposed connecting element is a disk protruding from the fixed wing both from the upper surface, where the disk is connected with the portion of the support connected to the rear rotor, and from the lower surface, where the disk is connected with the portion of the support connected to the front rotor, and the connection shaft is connected to the center of the disk.

13. The aerodyne according to claim 2, wherein the connection shaft is located in a half of the wing closest to the leading edge.

14. The aerodyne according to claim 13, wherein said connection shaft is located in the center of the half of the wing closest to the leading edge.

15. The aerodyne according to claim 1, wherein in the lift position, the two front rotors and the two rear rotors are equidistant with respect to an axis parallel to the vertical axis of the fuselage which intersects the center of gravity of the aerodyne.

16. The aerodyne according to claim 1, wherein the connection shaft intersects an axis parallel to the vertical axis of the fuselage which in turn intersects the center of gravity of the aerodyne.

17. The aerodyne according to claim 1, wherein each support holds two motors, each motor is connected to a rotor, and said rotors are coaxial, spaced apart, and parallel.

18. The aerodyne according to claim 11, wherein the connection shaft is located in a half of the wing closest to the leading edge.

\* \* \* \* \*